(No Model.)
J. MINCHENER.
COTTON PLANTER.
No. 283,135. Patented Aug. 14, 1883.
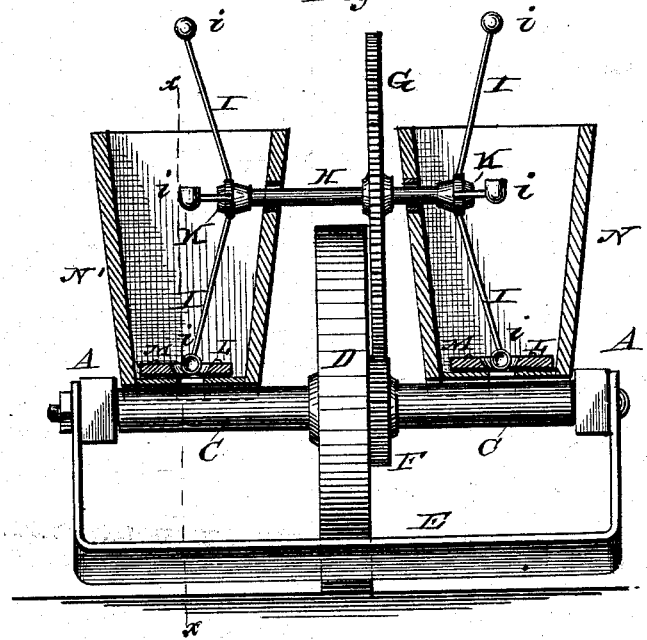
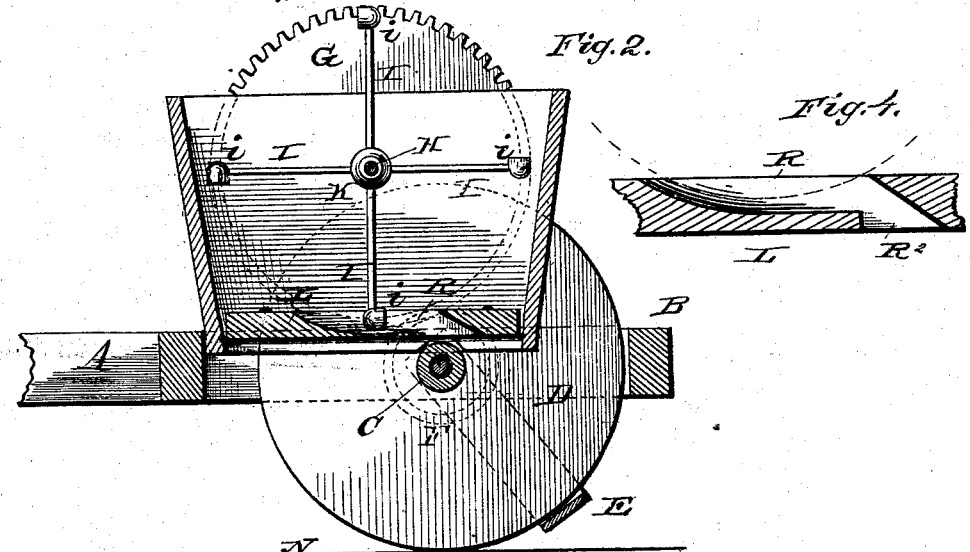
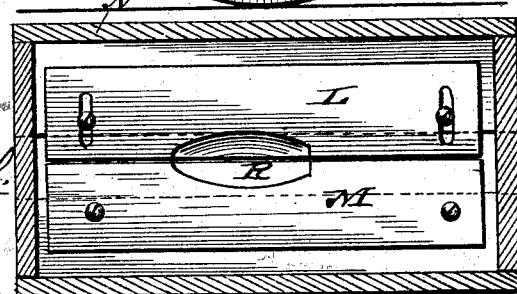
Witnesses:
Phil C. Dittrich
W. H. Keyworth
Inventor:
J. S. Minchener
by J. H. Alexander,
Attorney.

UNITED STATES PATENT OFFICE.

JOSEPH MINCHENER, OF TROY, ALABAMA.

COTTON-PLANTER.

SPECIFICATION forming part of Letters Patent No. 283,135, dated August 14, 1883.

Application filed March 15, 1883. (No model.)

*To all whom it may concern:*

Be it known that I, JOSEPH MINCHENER, of Troy, in the county of Pike and State of Alabama, have invented certain new and useful Improvements in Cotton-Planters; and I do hereby declare that the following is a full, clear, and exact description thereof, reference being had to the accompanying drawings, and to the letters of reference marked thereon, which form part of this specification.

My invention relates to improvements in combined seed-planting and fertilizer-distributing machines; and it consists in certain novel features of construction and arrangements, as will be hereinafter more fully set forth and described.

In the accompanying drawings, Figure 1 is a rear elevation partly in section. Fig. 2 is a vertical section through one of the hoppers on line $x$ $x$ of Fig. 1. Fig. 3 is a plan view of one of the hoppers, showing the construction and arrangement of the bottom thereof. Fig. 4 is an enlarged detail view of one-half of the seed-gage.

Similar letters denote like parts.

A A represent the side, and B the end, beams constituting the frame-work, within which the operative portions of my device are assembled. Near the ends of the side beams, A A, is journaled the axle C, which carries the main supporting-wheel D. To one side of wheel D is bolted or clamped the small gear wheel or pinion F. Upon the said frame are suitably secured the hoppers N N', which are designed for the distribution of seed and fertilizing material simultaneously, and they are located with their central line just above or slightly in advance of the main axle C, one on each side of the wheel D. The said hoppers are of any convenient form, and are provided at their bottoms with the plates L M, through which the seed is forcibly distributed. The shaft H is suitably journaled in the sides of said hoppers N N', and carries the gear-wheel G, that is located between the hoppers and meshes with its operative pinion F.

Upon each end of the shaft H is placed a detachable hub, K, from which radiate the arms or stirrers I, which are detachably secured to said hub—as, for instance, by being screwed into suitable apertures therein—and of which stirrers any desired number may be used. The said axles terminate near the inner sides of the hoppers, so as to leave the central portion as free as possible. The arms I are provided with spoon or cup shaped extremities $i$, the object of which is to force the material through the exits prepared therefor.

The bottom of the hoppers are slotted longitudinally to a somewhat greater extent than is ever needed in practice, and above said slots the plates L and M are secured, the plate M rigidly and the plate L subject to lateral adjustment, as shown. The said plates are recessed at R and apertured at $R^2$, as shown in Fig. 4, the recess being of about the same radius as the path of the arms I, and the aperture extending obliquely downward, and adapted only to discharge the contents of the hoppers when the same is forced longitudinally therethrough by the passage of the arms, the said apertures being closed vertically. The discharge will not be continuous unless such arrangement is found to be necessary. By moving the plate L a larger opening and continuous discharge can be obtained.

By altering the sizes of the pinion F and wheel G, and also by varying the number of the arms I, considerable variation in the frequency and quantity of the discharge can be attained, and the implement be adapted to the distribution of a large variety of materials.

A covering blade or board, E, is pivotally attached to the rear of the machine, and the implement is adapted for use separately, or as an attachment for a plow.

Having described my invention, I claim—

1. In a cotton-planter, the combination of a supporting and driving wheel, hoppers arranged one on each side of said wheel and adapted to contain seed and fertilizing material, respectively, a horizontal shaft terminating in said hoppers and carrying detachable stirrer-arms, and gearing connecting said stirrer and driving shafts, and a laterally-adjustable hopper-bottom or seed-gage formed with an elliptical recess, and oblique discharge-opening located at one end of said recess, through which the contents of the hoppers are forcibly distributed by the rotating arms while the said openings are closed vertically, all substantially as shown and described.

2. In a cotton-planter, the centrally-located supporting and driving wheel and pinion in combination with the wheel G, shaft H, hubs K, and detachable arms I, formed with cup-shaped extremities $i$, suitable hoppers, and the elliptically-recessed seed-gage, substantially as set forth.

3. The herein-described hopper provided with fixed plates M and laterally-adjustable plate L, elliptically recessed at R and apertured at $R^2$, in combination with stirrer-arms I, having extensions $i$, and means, substantially as described, for rotating said arms and discharging the seed, as set forth.

In testimony that I claim the foregoing as my own I affix my signature in presence of two witnesses.

JOS. MINCHENER.

Witnesses:
F. O. McCLEARY,
FRANKLAND JANNUS.